(12) United States Patent
Okamoto et al.

(10) Patent No.: US 11,727,956 B2
(45) Date of Patent: Aug. 15, 2023

(54) DISK DEVICE WITH DAMPING MEMBER OF SHAFT FOR MULTI-ACTUATOR ASSEMBLIES

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Makoto Okamoto, Tokyo (JP); Takuma Kido, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/669,029

(22) Filed: Feb. 10, 2022

(65) Prior Publication Data
US 2023/0010930 A1    Jan. 12, 2023

(30) Foreign Application Priority Data
Jul. 12, 2021 (JP) ................................ 2021-115162

(51) Int. Cl.
| | | |
|---|---|---|
| *G11B 5/48* | (2006.01) | |
| *G11B 5/55* | (2006.01) | |
| *G11B 33/08* | (2006.01) | |
| *G11B 19/20* | (2006.01) | |

(52) U.S. Cl.
CPC .......... *G11B 5/4813* (2013.01); *G11B 5/5578* (2013.01); *G11B 33/08* (2013.01); *G11B 19/2018* (2013.01)

(58) Field of Classification Search
None
See application file for complete search history.

(56) References Cited

U.S. PATENT DOCUMENTS

| | | | | |
|---|---|---|---|---|
| 5,491,598 A * | 2/1996 | Stricklin et al. | ...... | G11B 5/5521 360/265.6 |
| 5,666,242 A * | 9/1997 | Edwards et al. | ...... | G11B 5/4806 360/265.6 |
| 5,930,071 A * | 7/1999 | Back | .................. | G11B 19/2018 360/265.2 |
| 6,163,441 A * | 12/2000 | Wood et al. | ........... | G11B 33/08 360/266.1 |
| 6,288,879 B1 * | 9/2001 | Misso et al. | ........... | G11B 33/08 360/265.6 |
| 6,333,839 B1 * | 12/2001 | Misso et al. | ......... | G11B 5/4813 360/265.7 |
| 6,411,472 B1 | 6/2002 | Allsup | | |
| 6,480,363 B1 | 11/2002 | Prater | | |

(Continued)

*Primary Examiner* — Craig A. Renner
(74) *Attorney, Agent, or Firm* — Kim & Stewart LLP

(57) ABSTRACT

A disk device includes one or more disks, a base shaft, a bearing shaft, first and second bearing units, first and second actuator assemblies, and a damping member. The bearing shaft has a tubular portion fixed around the base shaft. The first and second bearing units are attached around the bearing shaft and aligned in an axial direction of the bearing shaft. The first and second actuator assemblies are coupled to the first and second bearing units, respectively. The damping member is provided between an outer circumferential surface of the base shaft and an inner circumferential surface of the tubular portion of the bearing shaft.

20 Claims, 7 Drawing Sheets

(56) References Cited

U.S. PATENT DOCUMENTS

| | | | |
|---|---|---|---|
| 7,085,108 B1 | 8/2006 | Oveyssi et al. | |
| 10,276,194 B2 | 4/2019 | Keshavan et al. | |
| 10,332,555 B1 | 6/2019 | Keshavan et al. | |
| 10,861,488 B2 * | 12/2020 | Hayasaka et al. | ... G11B 5/4813 |

* cited by examiner

DISK DEVICE WITH DAMPING MEMBER OF SHAFT FOR MULTI-ACTUATOR ASSEMBLIES

CROSS-REFERENCE TO RELATED APPLICATION(S)

This application is based upon and claims the benefit of priority from Japanese Patent Application No. 2021-115162, filed Jul. 12, 2021, the entire contents of which are incorporated herein by reference.

FIELD

Embodiments described herein relate generally to a disk device.

BACKGROUND

A disk device, such as a hard disk drive (HDD), includes a disk provided in a housing, a spindle motor that supports and rotates the disk, a head actuator supporting a head, a voice coil motor that drives the head actuator, a flexible printed circuit board and so forth.

The head actuator includes an actuator block that pivots on a support shaft, a plurality of arms extending from the actuator block, and a head suspension assembly connected to an extension end of each arm.

With an increase in storage capacity of the disk device, the number of disks mounted in the housing is also growing. To accommodate a large number of disks, what is called a multi-actuator configuration is proposed in which a head actuator includes a plurality of actuator blocks that can pivot independently. One actuator block is supported so as to pivot on a support shaft. Another actuator block is supported so as to pivot on the same support shaft and is aligned with the one actuator block in an axial direction.

In the multi-actuator configuration, two actuators perform a pivot operation independently of each other, which may cause a torsional resonant mode. That is, a vibration caused by a pivot operation of one actuator and a vibration caused by a pivot operation of the other actuator may resonate.

DETAILED DESCRIPTION

Figure 1:
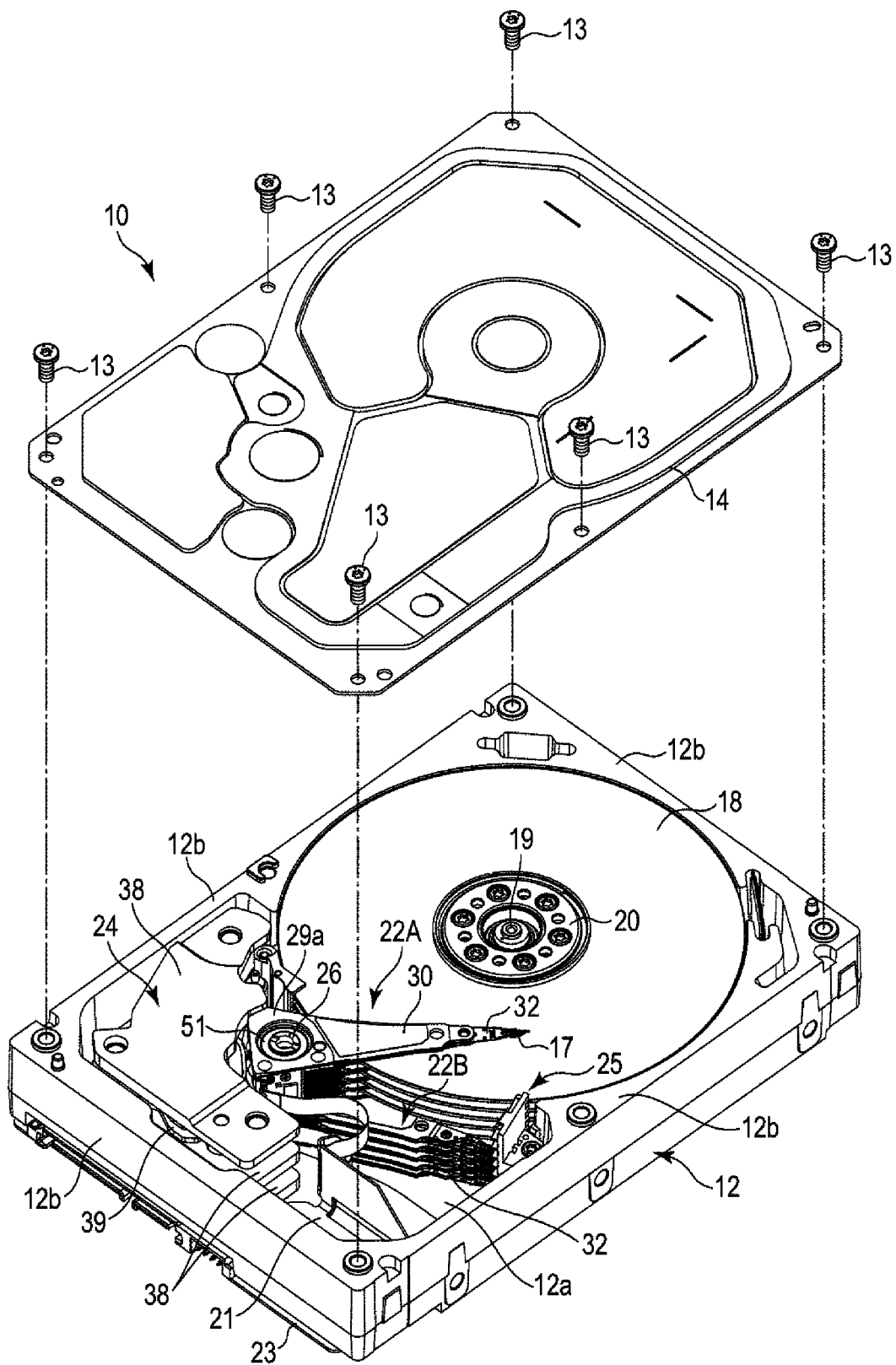
FIG. 1 illustrates an exploded perspective view of a hard disk drive (HDD) according to a first embodiment with a top cover detached therefrom.

Embodiments provide a disk device that can prevent a torsional resonant mode.

In general, according to an embodiment, a disk device includes one or more disks, a base shaft, a bearing shaft, first and second bearing units, first and second actuator assemblies, and a damping member. The bearing shaft has a tubular portion fixed around the base shaft. The first and second bearing units are attached around the bearing shaft and aligned in an axial direction of the bearing shaft. The first and second actuator assemblies are coupled to the first and second bearing units, respectively. The damping member is provided between an outer circumferential surface of the base shaft and an inner circumferential surface of the tubular portion of the bearing shaft.

Hereinafter, a disk device according to one or more embodiments will be described with reference to the drawings.

It is noted that the present disclosure is merely an example and it goes without saying that the present disclosure covers any change or modification which is appropriately made without departing from the spirit of the present disclosure and can be easily conceived by a person skilled in the art. Moreover, the widths, thicknesses, shapes and so forth of portions in the drawings are sometimes depicted more schematically than their actual widths, thicknesses, shapes and so forth to give a clearer explanation; they are presented by way of example only and do not limit the interpretation of the present disclosure. Furthermore, in the specification and the drawings, an element which is the same as that explained in connection with the already-discussed drawing is denoted by the same reference sign and detailed explanations thereof are sometimes omitted as appropriate.

First Embodiment

As a disk device, a hard disk drive (HDD) according to a first embodiment will be described in detail.

FIG. 1 illustrates an exploded perspective view of the HDD according to the first embodiment with a top cover detached therefrom.

The HDD includes a flat and rectangular housing 10. The housing 10 includes: a base 12 in the shape of a rectangular box with an opening in the top thereof; and a top cover 14. The top cover 14 is secured to the base 12 with a plurality of screws 13 and closes the upper-end opening of the base 12. The base 12 includes a rectangular bottom wall 12a facing the top cover 14 with a clearance therebetween and side walls 12b standing along the outer edges of the bottom wall 12a, and is formed in one piece of aluminum, for example. The top cover 14 is formed of, for example, stainless steel in the shape of a rectangular plate.

A plurality of, for example, nine magnetic disks 18 as recording media and a spindle motor 19 as a driving portion that supports and rotates the magnetic disks 18 are provided in the housing 10. The spindle motor 19 is provided on the bottom wall 12a in a prescribed manner. Each magnetic disk 18 has a diameter of 96 mm, for example, and has a magnetic recording layer on the upper surface and/or the lower surface thereof. The magnetic disks 18 are coaxially fitted onto a non-illustrated hub of the spindle motor 19 and are fixed to the hub by being clamped by a clamp spring 20. The magnetic disks 18 are supported in a state in which they are located parallel to the bottom wall 12a of the base 12. The plurality of magnetic disks 18 are rotated by the spindle motor 19 at predetermined rpm.

The number of magnetic disks 18 is not limited to nine and may be increased or decreased.

A plurality of magnetic heads 17 that record information on the magnetic disks 18 and reproduce information therefrom and a head actuator assembly that supports these magnetic heads 17 in such a way that the magnetic heads 17 can move with respect to the magnetic disks 18 are provided in the housing 10. In the present embodiment, the head actuator assembly is a multi-actuator assembly including a plurality of actuator assemblies, for example, a first actuator assembly 22A and a second actuator assembly 22B. The first and second actuator assemblies 22A and 22B are supported so as to be able to pivot on a common base shaft (may be referred to as "pivot") 26.

Voice coil motors (VCMs) 24 that pivot and position the first and second actuator assemblies 22A and 22B, a ramp loading mechanism 25 that holds the magnetic heads 17 in unloaded positions separated from the magnetic disks 18 when the magnetic heads 17 move to the outermost edges of the magnetic disks 18, and an FPC unit (may be referred to as a "board unit") 21 on which electronic components such as a conversion connector are mounted are provided in the housing 10.

A printed circuit board 23 is secured to the outer surface of the bottom wall 12a with screws. The printed circuit board 23 configures a controller, and the controller controls the operation of the spindle motor 19 and controls the operation of the VCMs 24 and the magnetic heads 17 via the FPC unit 21.

Figure 2:
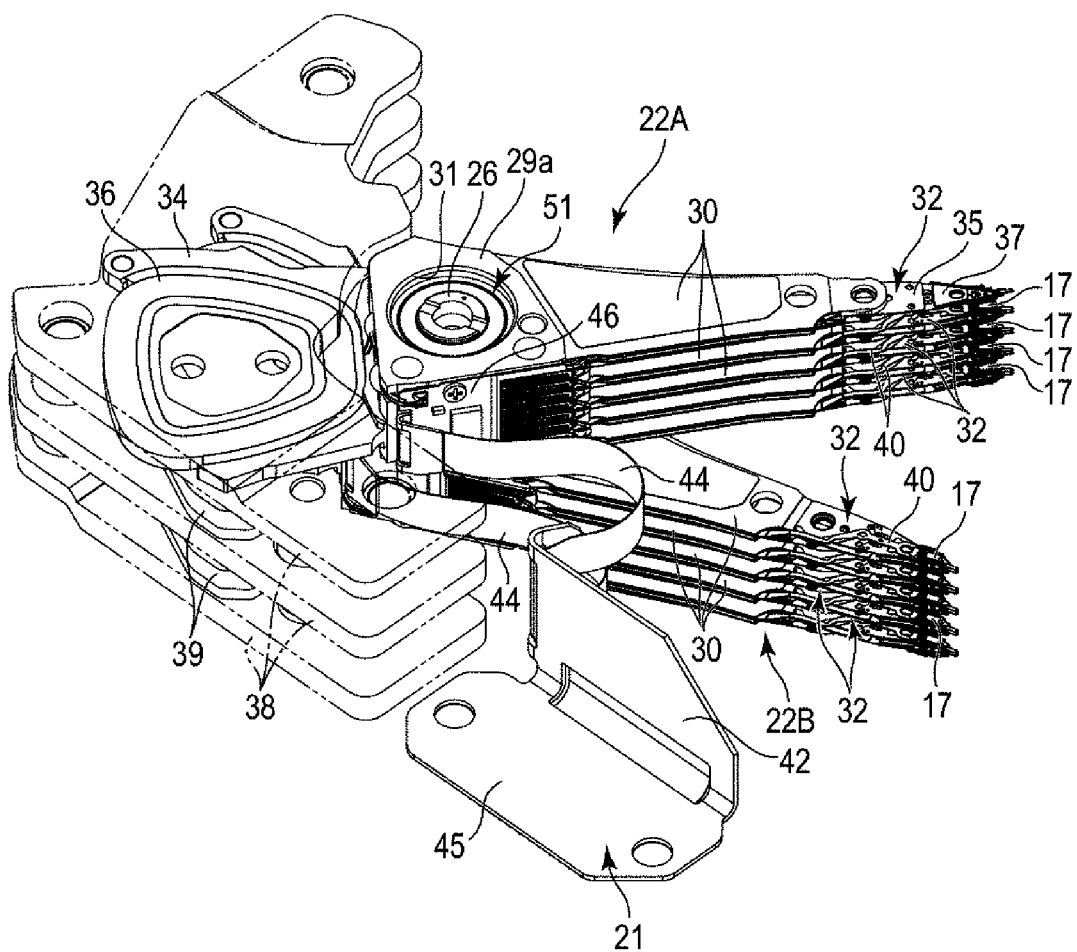
FIG. 2 illustrates a perspective view of actuator assemblies and a flexible printed circuit (FPC) unit of the HDD.
Figure 3:
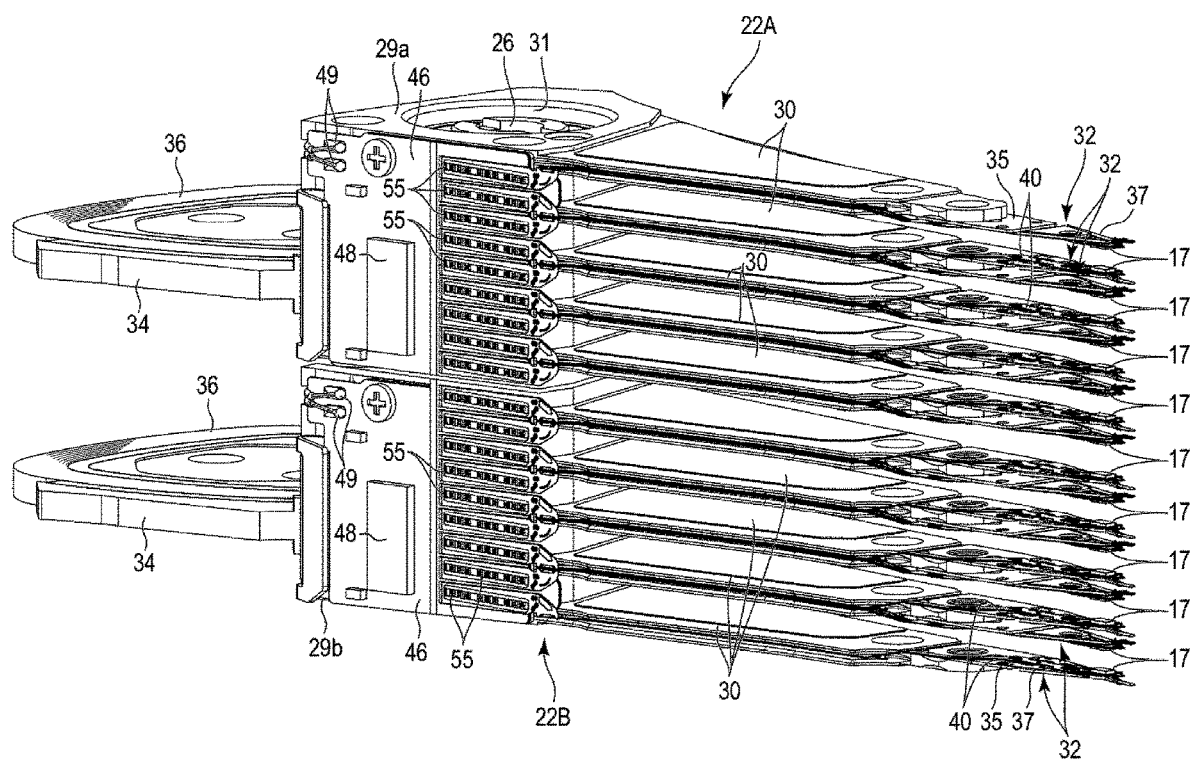
FIG. 3 illustrates a perspective view of the actuator assemblies in an aligned state.

FIG. 2 illustrates a perspective view of the multi-actuator assembly and the FPC unit 21, and FIG. 3 illustrates a perspective view of the multi-actuator assembly in an aligned state.

As shown in FIGS. 2 and 3, the multi-actuator assembly includes the first actuator assembly 22A and the second actuator assembly 22B. The first and second actuator assemblies 22A and 22B are disposed such that one is placed above the other and are provided in such a way that they can pivot independently of each other on the common base shaft 26 standing on the bottom wall 12a of the base 12. The first actuator assembly 22A and the second actuator assembly 22B have almost the same structure. In one example, the actuator assembly disposed on the upper side is assumed to be the first actuator assembly 22A and the actuator assembly disposed on the lower side is assumed to be the second actuator assembly 22B.

The first actuator assembly 22A includes an actuator block 29a (which may also be referred to as a "first actuator block 29a"), five arms 30 extending from the actuator block 29a, head suspension assemblies (may be referred to as "head gimbal assemblies (HGAs)") 32 attached to the arms 30, and the magnetic heads 17 supported by the head suspension assemblies 32, respectively. The actuator block 29a has an inner hole 31, and a bearing unit (may be referred to as a "unit bearing") 51 is housed in the inner hole 31. The actuator block 29a is pivotally supported on the base shaft 26 by the bearing unit 51.

In the present embodiment, the actuator block 29a and the five arms 30 are formed in one piece of aluminum or the like and constitute what is called an "E block". Each arm 30 is formed in the shape of a long and narrow flat plate, for example, and extends from the actuator block 29a in a direction orthogonal to the base shaft 26. The five arms 30 are provided parallel to one another with a clearance therebetween.

The first actuator assembly 22A includes a supporting frame 34 extending from the actuator block 29a in a direction opposite to the arms 30. A voice coil 36 is supported by the supporting frame 34. As shown in FIGS. 1 and 2, the voice coil 36 is located between a pair of yokes 38 provided on the base 12 and constitutes the VCM 24 with these yokes 38 and a magnet 39 fixed to any one of the yokes 38.

As shown in FIGS. 2 and 3, the first actuator assembly 22A includes nine head suspension assemblies 32, and these head suspension assemblies 32 are attached to the extension ends of the arms 30. The head suspension assemblies 32 include an up head suspension assembly 32 that supports the magnetic head 17 in such a way that the magnetic head 17 faces upward and a down head suspension assembly 32 that supports the magnetic head 17 in such a way that the magnetic head 17 faces downward. The up head suspension assembly 32 is obtained by placing a head suspension assembly 32 having a given structure so as to face upward, and the down head suspension assembly 32 is obtained by placing a head suspension assembly 32 having the same structure so as to face downward. In the present embodiment, in the first actuator assembly 22A, the down head suspension assembly 32 is attached to the uppermost arm 30. Two head suspension assemblies 32, namely, an up head suspension assembly 32 and a down head suspension assembly 32, are attached to each of the other four arms 30.

The nine head suspension assemblies 32 extend from the five arms 30 and are almost parallel to one another with a predetermined space therebetween. Two magnetic heads 17 supported by each of four sets of the down head suspension assembly 32 and the up head suspension assembly 32, in which the lowermost down head suspension assembly 32 is not included, face each other with a predetermined space therebetween. These magnetic heads 17 face both sides of a corresponding magnetic disk 18. The magnetic head 17 of the lowermost down head suspension assembly 32 faces the upper surface of a magnetic disk 18 which is placed between this magnetic head 17 and the magnetic head 17 of the uppermost up head suspension assembly 32 of the second actuator assembly 22B, which will be described below.

Each suspension assembly 32 includes a rectangular base plate 35 fixed to the arm 30, a load beam 37 in the shape of a long and narrow flat spring, and a flexure (may be referred to as a "wiring member") 40 in the shape of a long and narrow band. A base end portion of the load beam 37 is placed on an end portion of the base plate 35 and fixed thereto. The load beam 37 extends from the base plate 35 and tapers down toward an extension end. The base plate 35 and the load beam 37 are formed of stainless steel, for example.

The flexure 40 is attached to the front surface of the load beam 37 and the base plate 35, extends outward from the side edge of the base plate 35, and extends to a base end portion (i.e., the actuator block 29a) of the arm 30 along the arm 30. A displaceable gimbal portion (may be referred to as an "elastic supporting portion") is provided in a tip end portion of the flexure 40 located on the load beam 37, and the magnetic head 17 is mounted on the gimbal portion. The wires of the flexure 40 are electrically connected to a read element, a write element, a heater, and other members of the magnetic head 17.

The flexure 40 has a connecting end 55 provided at an extension end. A plurality of connecting terminals are provided in the connecting end 55. The connecting end 55 is joined to an FPC (described below), which is provided on a side surface of the actuator block 29a.

On the other hand, the second actuator assembly 22B has a structure similar to that of the first actuator assembly 22A. That is, as shown in FIGS. 2 and 3, the second actuator assembly 22B includes an actuator block 29b (which may also be referred to as a "second actuator block 29b") fixed to the bearing unit 51 (described below), five arms 30 extending from the actuator block 29b, nine head suspension assemblies 32 attached to the arms 30, the magnetic heads 17 mounted on the head suspension assemblies 32, and the supporting frame 34 supporting the voice coil 36.

The actuator block 29b is rotatably supported on the base shaft 26 via the bearing unit 51. The actuator block 29b is supported on a base end portion of the base shaft 26 (half of the base shaft 26 on the side thereof closer to the bottom wall 12a) and is disposed below the actuator block 29a so as to be coaxial therewith. The actuator block 29b faces the actuator block 29a with a slight gap G therebetween.

In the second actuator assembly 22B, the up head suspension assembly 32 is attached to the lowermost arm 30. Two head suspension assemblies 32, namely an up head suspension assembly 32 and a down head suspension assembly 32, are attached to each of the other four arms 30. The voice coil 36 of the second actuator assembly 22B is located between a pair of yokes 38 provided on the base 12 and constitutes the VCM 24 with these yokes 38 and a magnet 39 fixed to any one of the yokes 38.

The VCM 24 that drives the first actuator assembly 22A and the VCM 24 that drives the second actuator assembly 22B are provided independently from each other. This makes it possible to drive (pivot) the first actuator assembly 22A and the second actuator assembly 22B independently.

As shown in FIG. 2, the FPC unit 21 includes, as integral parts thereof, a rectangular base portion 42, two junction portions 44, each being in the shape of a long and narrow band and extending from one side edge of the base portion 42, and two joint portions (a first wiring board and a second wiring board) 46, each being continuously provided at the tip of the corresponding junction portion 44. The base portion 42, the junction portions 44, and the joint portions 46 are formed of a flexible printed circuit board (FPC). The flexible printed circuit board includes: an insulating layer such as polyimide; a conductive layer that is formed on the insulating layer and forms wires, connecting pads and so forth; and a protective layer covering the conductive layer.

Non-illustrated electronic components such as a conversion connector and a plurality of capacitors are mounted on the base portion 42 and electrically connected to non-illustrated wires. A metal plate 45 functioning as a reinforcing sheet is stuck on the base portion 42. The base portion 42 is provided on the bottom wall 12a of the base 12. The two junction portions 44 extend from the side edge of the base portion 42 toward the first and second actuator assemblies 22A and 22B. Each of the joint portions 46 provided at the extension ends of the junction portions 44 is stuck on one side surface (may be referred to as a "mounting surface") of a corresponding one of the actuator blocks 29a and 29b with an non-illustrated backing plate placed therebetween and is secured to the mounting surface with a fastening screw.

As shown in FIGS. 2 and 3, connecting ends 55 of the flexures 40 are joined to the joint portions 46 and electrically connected to the wires of the joint portions 46. A head IC (a head amplifier) 48 is mounted on each joint portion 46, and the head IC 48 is connected to the connecting ends 55 and the base portion 42 via the wires. Furthermore, the joint portion 46 includes a connecting pad 49 to which the voice coil 36 is connected.

The nine magnetic heads 17 of the first actuator assembly 22A are electrically connected to the base portion 42 through the wires of the flexures 40, the connecting ends 55, and the joint portion 46, and the junction portion 44 of the FPC unit 21. Likewise, the nine magnetic heads 17 of the second actuator assembly 22B are electrically connected to the base portion 42 through the wires of the flexures 40, the connecting ends 55, and the joint portion 46, and the junction portion 44 of the FPC unit 21. Furthermore, the base portion 42 is electrically connected, via the conversion connector, to the printed circuit board 23 on the bottom surface of the housing 10.

Figure 4:
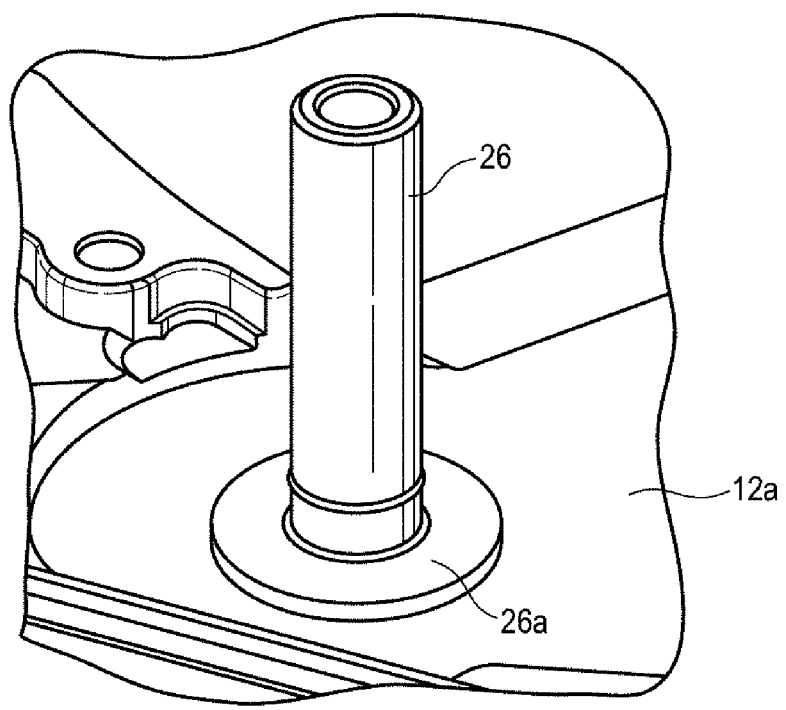
FIG. 4 illustrates a perspective view of a base shaft that supports the actuator assemblies.

Next, a supporting structure of the first actuator assembly 22A and the second actuator assembly 22B will be described in detail. FIG. 4 illustrates a perspective view of the base shaft 26, FIG. 5 illustrates a cross-sectional view of the actuator blocks 29a and 29b and a bearing portion, and FIGS. 6A and 6B illustrate perspective views of a damping member 60.

As shown in FIG. 4, the base shaft 26 serving as a pivot of an actuator stands almost vertically on the bottom wall 12a of the base 12. In one example, the base shaft 26 has a shape of a circular cylinder and is integral with the bottom wall 12a. The base shaft 26 has a fixing screw hole formed in an axial upper end portion. The base shaft 26 includes, as an integral part thereof, an annular flange (seat) 26a provided in the rim at the base end.

In the following description, an element of the first actuator assembly 22A is described with "first" prefixed thereto and an element of the second actuator assembly 22B is described with "second" prefixed thereto.

Figure 5:
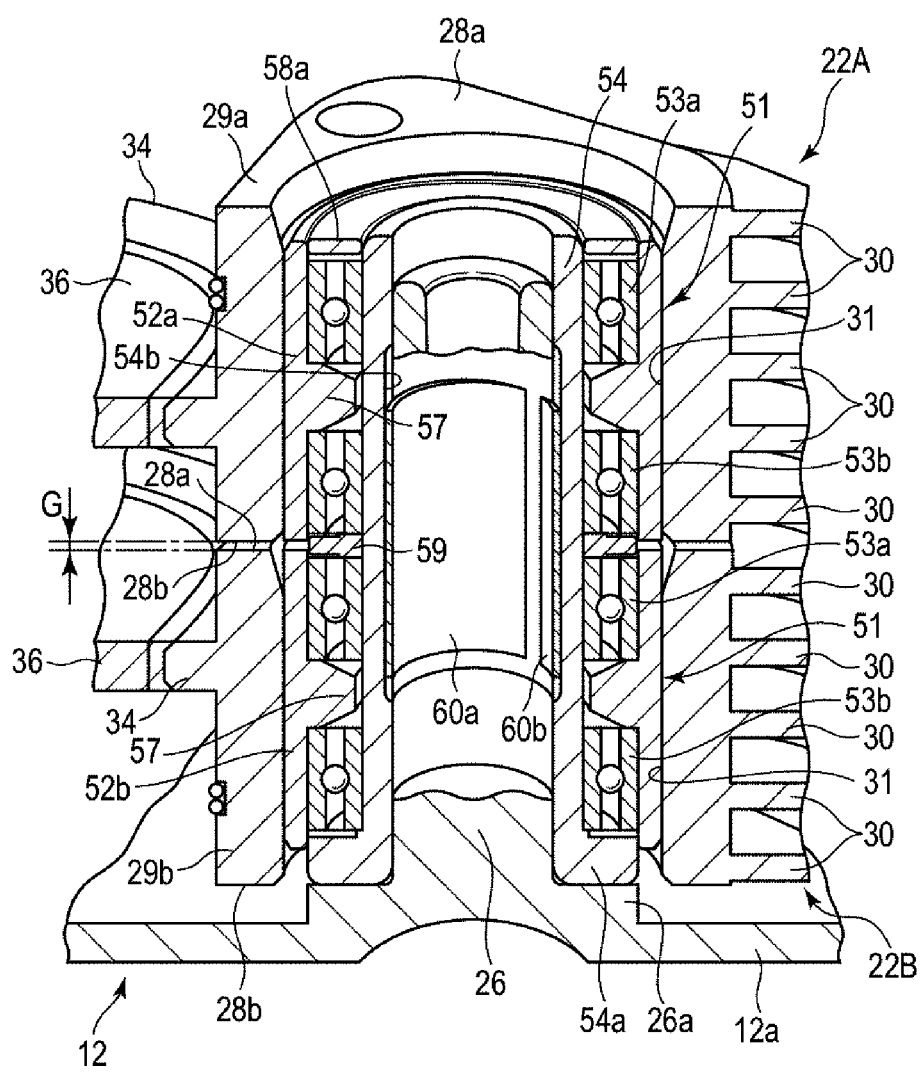
FIG. 5 illustrates a cross-sectional view of a bearing portion of the actuator assemblies.
Figures 6A, 6B:
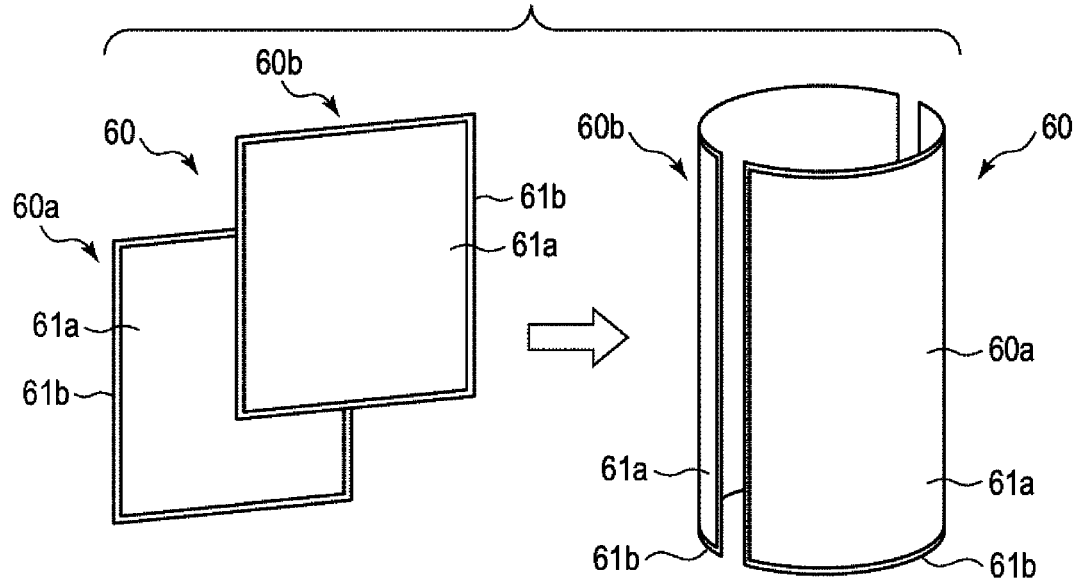
FIGS. 6A and 6B illustrate perspective views of a damping member.

As shown in FIG. 5, the first bearing unit 51 of the first actuator assembly 22A and the second bearing unit 51 of the second actuator assembly 22B have a common bearing shaft 54. The bearing shaft 54 is formed in a shape of a cylinder and includes an annular flange 54a in the rim at the lower end. The bearing shaft 54 is fit onto the periphery of the base shaft 26 and extends so as to be coaxial with the base shaft 26. The flange 54a of the bearing shaft 54 is placed on the flange 26a of the base shaft 26.

An annular recess 54b is formed in the axial central part of the inner circumferential surface of the bearing shaft 54. In one example, the recess 54b has a depth (measured in the radial direction) of about 0.15 mm. Consequently, the bearing shaft 54 is fit onto the outer circumferential surface of the base shaft 26 at the inner circumferential surface of the bearing shaft 54 other than a portion where the recess 54b is formed, that is, the inner circumferential surface of an upper end portion of the bearing shaft 54 and the inner circumferential surface of a lower end portion of the bearing shaft 54.

Each of the first and second actuator blocks 29a and 29b of the first and second actuator assemblies 22A and 22B has an upper end surface 28a and a lower end surface 28b that extend in a direction orthogonal to the base shaft 26. The inner hole 31 passes through the first and second actuator blocks 29a and 29b and has openings in the upper end surface 28a and the lower end surface 28b. The inner hole 31 is coaxial with the base shaft 26.

The first actuator block 29a is pivotally supported on an axial upper end-side portion of the bearing shaft 54 via the first bearing unit 51. The first bearing unit 51 includes a cylindrical sleeve (may be referred to as a "first sleeve") 52a and a plurality of, for example, a pair of ball bearings 53a and 53b fit between the first sleeve 52a and the bearing shaft 54.

The first sleeve 52a has an axial length which is nearly equal to the height of the first actuator block 29a. The first sleeve 52a has an outside diameter which is nearly equal to the diameter of the inner hole 31. The first sleeve 52a has an inside diameter larger than the outside diameter of the bearing shaft 54. The first sleeve 52a includes, as an integral part thereof, an annular projection 57 projecting from an axial middle portion of the inner circumferential surface of the first sleeve 52a toward the axial center.

The first sleeve 52a is fit into the inner hole 31 of the first actuator block 29a and fixed to the first actuator block 29a with an adhesive or the like. The first sleeve 52a is coaxial with the inner hole 31, and an axial upper end and a lower end of the first sleeve 52a are nearly aligned with the upper end surface 28a and the lower end surface 28b, respectively, of the first actuator block 29a.

The ball bearing 53a is placed inside an upper end portion of the first sleeve 52a with an inner race fit onto the outer circumferential surface of the bearing shaft 54 and an outer race fit onto the inner circumferential surface of the first sleeve 52a. The ball bearing 53b is placed inside a lower end portion of the first sleeve 52a with an inner race fit onto the outer circumferential surface of the bearing shaft 54 and an outer race fit onto the inner circumferential surface of the first sleeve 52a. The projection 57 is located between the ball bearings 53a and 53b and functions as a spacer.

An annular cap 58a is attached to an inner perimeter of the upper end portion of the first sleeve 52a. The cap 58a faces the upper ball bearing 53a with a slight clearance therebetween. The cap 58a functions as a cover that prevents grease from spreading from the ball bearing 53a.

The second actuator assembly 22B is pivotally supported on a base end-side portion of the bearing shaft 54 via the second bearing unit 51. The second bearing unit 51 has almost the same structure as that of the first bearing unit 51 of the first actuator assembly 22A.

Specifically, the second bearing unit 51 includes a cylindrical second sleeve 52b placed on the periphery of the bearing shaft 54 so as to be coaxial therewith and a plurality of, for example, two ball bearings 53a and 53b fit between the bearing shaft 54 and the second sleeve 52b.

The second sleeve 52b has an axial length nearly equal to the height of the second actuator block 29b. The second sleeve 52b has an outside diameter nearly equal to the diameter of the inner hole 31. The second sleeve 52b has an inside diameter larger than the outside diameter of the bearing shaft 54. The second sleeve 52b includes, as an integral part thereof, an annular projection 57 projecting from an axial middle portion of the inner circumferential surface of the second sleeve 52b toward the axial center.

The second sleeve 52b is fit into the inner hole 31 of the second actuator block 29b and fixed to the second actuator block 29b with an adhesive or the like. The second sleeve 52b is coaxial with the inner hole 31, and an axial upper end and a lower end of the second sleeve 52b are nearly aligned with the upper end face 28a and the lower end face 28b, respectively, of the second actuator block 29b.

The ball bearing 53a is placed inside an upper end portion of the second sleeve 52b with an inner race fit onto the outer circumferential surface of the bearing shaft 54 and an outer race fit onto the inner circumferential surface of the second sleeve 52b. The ball bearing 53b is placed inside a lower end portion of the second sleeve 52b with an inner race fit onto the outer circumferential surface of the bearing shaft 54 and an outer race fit onto the inner circumferential surface of the second sleeve 52b. The projection 57 is located between the ball bearings 53a and 53b and functions as a spacer.

The second sleeve 52b and the second actuator block 29b are pivotally supported on the bearing shaft 54 and the base shaft 26 by the ball bearings 53a and 53b.

Between the first bearing unit 51 and the second bearing unit 51, a spacer ring 59 is fit onto the outer periphery of the bearing shaft 54. The spacer ring 59 is sandwiched between the lower ball bearing 53b of the first bearing unit 51 and the upper ball bearing 53a of the second bearing unit 51, and abuts the inner races of these ball bearings 53b and 53a and faces the outer races of these ball bearings 53b and 53a with a clearance between the spacer ring 59 and the outer races.

As described above, the first actuator assembly 22A and the second actuator assembly 22B are supported on the bearing shaft 54 and the base shaft 26 in such a way that the first actuator assembly 22A and the second actuator assembly 22B can pivot independently with the first bearing unit 51 and the second bearing unit 51, respectively. The lower end face 28b of the first actuator block 29a and the upper end face 28a of the second actuator block 29b face each other with a gap G therebetween.

As shown in FIG. 5, according to the present embodiment, the damping member 60 (60a, 60b) is provided between the outer circumferential surface of the base shaft 26 and the inner circumferential surface of the bearing shaft 54. According to the present embodiment, the damping member 60 includes two damping members 60a and 60b formed in a shape of a rectangular sheet. As shown in FIGS. 6A and 6B, the damping members 60a and 60b each include a rectangular adhesive layer 61a and a restraint layer 61b having almost the same shape as the adhesive layer 61a, and the restraint layer 61b is placed and stuck on the adhesive layer 61a. In one example, the adhesive layer 61a has a thickness of 50 μm and the restraint layer 61b has a thickness of about 50 μm. A metal layer, for example, a stainless steel (SUS) layer is used as the restraint layer 61b.

The two damping members 60a and 60b are deformed into a semicylindrical shape and stuck on the inner circumferential surface of the bearing shaft 54. The side of each of the damping members 60a and 60b where the adhesive layer 61a is located is stuck onto the bearing shaft 54. According to the present embodiment, as shown in FIG. 5, the damping members 60a and 60b are stuck onto the inner surface of the recess 54b in the inner circumferential surface of the bearing shaft 54. The damping members 60a and 60b are each placed in such a way that a pair of side edges extends in an axial direction, and the damping members 60a and 60b are arranged side by side, slightly separated from each other in a circumferential direction. The damping members 60a and 60b face the boundary between the first actuator block 29a and the second actuator block 29b, and extend in the axial direction and the circumferential direction, including the boundary.

The damping member 60 (60a, 60b) provided between the outer circumferential surface of the base shaft 26 and the inner circumferential surface of the bearing shaft 54 makes it possible to reduce torsional vibration that occurs when the first actuator assembly 22A and the second actuator assembly 22B perform a pivot operation independently of each other and thereby prevent a torsional resonant mode. This makes it possible to reduce mutual interference of two actuator assemblies and improve stability and reliability of the operation of an actuator.

According to the present embodiment, placing the damping members 60a and 60b having a thickness of 100 μm in the recess 54b which is 0.15 mm in depth makes the damping members 60a and 60b face the outer circumferential surface of the base shaft 26 with a slight clearance therebetween. This prevents the damping members 60a and 60b from interfering with the base shaft 26.

As shown in FIG. 1, in a state in which the first and second actuator assemblies 22A and 22B with the above-described structure are mounted in the housing 10, each magnetic disk 18 is located between two suspension assemblies 32. When the HDD is operating, the first actuator assembly 22A and the second actuator assembly 22B are pivoted independently of each other or in an integrated manner and each magnetic head 17 attached to one of the suspension assemblies 32 faces the upper surface and the lower surface of a corresponding magnetic disk 18.

Although the HDD with the above structure according to the first embodiment has a structure in which the first actuator assembly 22A and the second actuator assembly 22B that can be driven independently are supported on the common base shaft 26 and disposed such that one is placed above the other, the damping member 60 (60a, 60b) provided between the outer circumferential surface of the base shaft 26 and the inner circumferential surface of the bearing shaft 54 makes it possible to reduce torsional vibration that occurs when the first actuator assembly 22A and the second actuator assembly 22B perform a pivot operation independently of each other and thereby prevent a torsional resonant mode. This makes it possible to reduce mutual interference of the two actuator assemblies and obtain the HDD with improved operation stability and reliability.

In the first embodiment, the shape and size of the damping member 60 are not limited to those of the embodiment and can be changed in various ways. The number of damping members 60 is not limited to two; one damping member 60 or three or more damping members 60 may be provided. A location where the damping member 60 is provided is not limited to a location where the damping member 60 faces the boundary between the first actuator block 29a and the second actuator block 29b; the damping member 60 may be provided in a location where the damping member 60 is adjacent to the above-mentioned boundary. The damping member 60 is not limited to a sheet-like damping member; the damping member 60 may be provided as an adhesive layer or a viscoelastic layer that is formed by applying an adhesive material or a viscoelastic material to the outer circumferential surface of the base shaft 26 or the inner circumferential surface of the bearing shaft 54.

Next, an HDD according to another embodiment will be described. In the embodiment described below, an element which is the same as that of the first embodiment described above is denoted by the same reference sign and the detailed explanations thereof are omitted or simplified, and an element different from that of the first embodiment will be mainly described.

Second Embodiment

Figure 7:
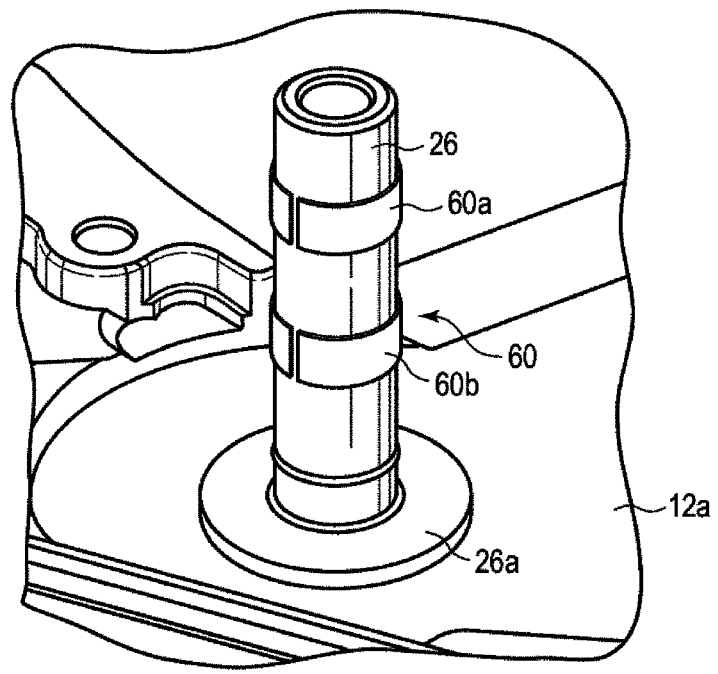
FIG. 7 illustrates a perspective view of a base shaft of a hard disk drive (HDD) according to a second embodiment.
Figure 8:
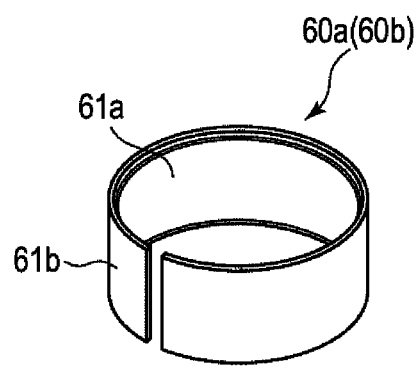
FIG. 8 illustrates a perspective view of a damping member of the HDD according to the second embodiment.
Figure 9:
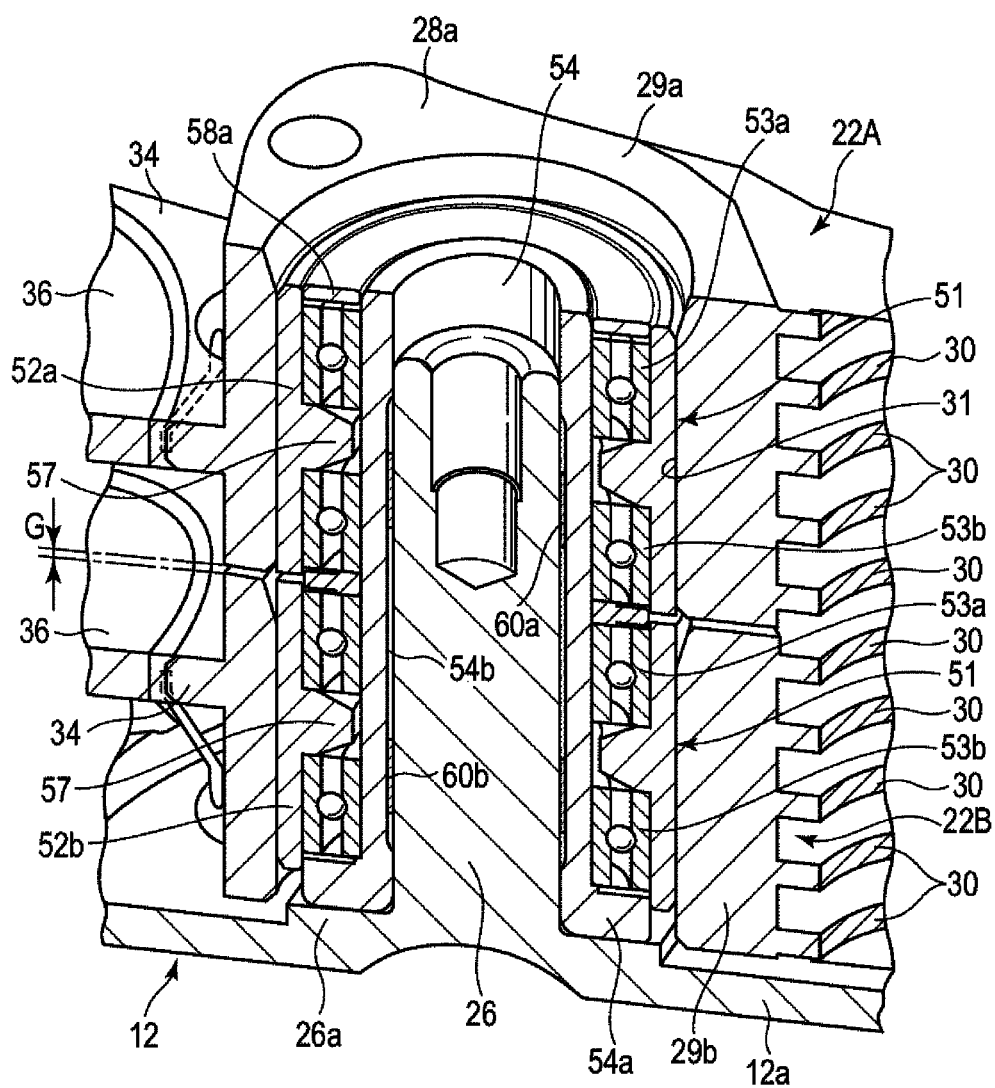
FIG. 9 illustrates a cross-sectional view of a bearing portion of actuator assemblies in the HDD according to the second embodiment.

FIG. 7 illustrates a perspective view of a base shaft of an HDD according to a second embodiment, FIG. 8 illustrates a perspective view of a damping member 60, and FIG. 9 illustrates a cross-sectional view of actuator blocks 29a and 29b and a bearing portion.

In the second embodiment, the shape and placement of the damping member 60 are different from those of the first embodiment described above.

As shown in FIG. 7, the base shaft 26 serving as a pivot of an actuator stands almost vertically on the bottom wall 12a of the base 12. In one example, the base shaft 26 has a shape of a circular cylinder and is integral with the bottom wall 12a. The base shaft 26 has a fixing screw hole formed in an axial upper end portion. The base shaft 26 includes, as an integral part thereof, an annular flange (seat) 26a provided in the rim at the base end.

According to the second embodiment, the damping member (60a, 60b) is stuck onto the outer circumferential surface of the base shaft 26. The damping member 60 includes a plurality of, for example, two damping members 60a and 60b.

As shown in FIG. 8, the damping members 60a and 60b each include a band-shaped or strip-shaped adhesive layer 61a having a predetermined width and a restraint layer 61b having almost the same shape as the adhesive layer 61a, and the restraint layer 61b is placed and stuck onto the adhesive layer 61a. In one example, the adhesive layer 61a has a thickness of 50 µm and the restraint layer 61b has a thickness of about 130 µm. A resin layer formed of synthetic resin is used as the restraint layer 61b.

As shown in FIG. 7, the two damping members 60a and 60b are deformed into a cylindrical shape and stuck onto the outer circumferential surface of the base shaft 26. The side of each of the damping members 60a and 60b where the adhesive layer 61a is located is stuck onto the base shaft 26. The damping members 60a and 60b are wound around almost the entire perimeter of the base shaft 26. The damping members 60a and 60b are placed so as to be separated from each other in an axial direction of the base shaft 26. In one example, the damping members 60a and 60b are placed so as to be located on both sides of the boundary between the first actuator assembly 22A and the second actuator assembly 22B. The damping members 60a and 60b have a width, that is, an axial width which is smaller than the axial height of the actuator blocks 29a and 29b.

As shown in FIG. 9, in a state in which the bearing shaft 54 and the first and second actuator assemblies 22A and 22B are assembled to the base shaft 26, the damping members 60a and 60b are located in the recess 54b formed in the inner circumferential surface of the bearing shaft 54 and abut the inner surface of the recess 54b (i.e., the inner circumferential surface of the bearing shaft 54). The damping member 60a faces an axial part of the actuator block 29a located approximately in the center of the actuator block 29a. The damping member 60b faces an axial part of the actuator block 29b located approximately in the center of the actuator block 29b. That is, the damping members 60a and 60b are placed near the boundary between the actuator block 29a and the actuator block 29b and on both sides of the boundary in an axial direction.

The outside diameter of the damping members 60a and 60b stuck onto the base shaft 26 is set so as to be larger than the inside diameter of the bearing shaft 54 (i.e., the inside diameter of the bottom face of the recess 54b). In a state in which the bearing shaft 54 is fit to the base shaft 26, the damping members 60a and 60b are in intimate contact with the inner circumferential surface of the bearing shaft 54. That is, the bearing shaft 54 and the base shaft 26 are connected to each other via the damping members 60a and 60b. Consequently, the damping member 60 (60a, 60b) makes it possible to reduce torsional vibration that occurs when the first actuator assembly 22A and the second actuator assembly 22B perform a pivot operation independently of each other and thereby prevent a torsional resonant mode. This makes it possible to reduce mutual interference of two actuator assemblies and improve the stability and reliability of the operation of an actuator.

According to the present embodiment, the restraint layer 61b of each of the damping members 60a and 60b is formed of a resin layer. This makes it possible to prevent the damping members 60a and 60b from generating metal contamination that can be generated due to rubbing of the materials when the base shaft 26 is inserted into the bearing shaft 54.

In the second embodiment, the rest of the structure of the HDD is identical to that of the HDD according to the first embodiment described earlier.

Although the HDD with the above structure according to the second embodiment has a structure in which the first actuator assembly 22A and the second actuator assembly 22B that can be driven independently are supported on the common base shaft 26 and disposed such that one is placed above the other, the damping member 60 (60a, 60b) provided between the outer circumferential surface of the base shaft 26 and the inner circumferential surface of the bearing shaft 54 makes it possible to reduce torsional vibration that occurs when the first actuator assembly 22A and the second actuator assembly 22B perform a pivot operation independently of each other and thereby prevent a torsional resonant mode. This makes it possible to reduce mutual interference of the two actuator assemblies and obtain the HDD with improved operation stability and reliability.

In the second embodiment, the shape, size and forming material of the damping member 60 and the formation material therefor are not limited to those of the embodiment and can be changed in various ways. The number of damping members 60 is not limited to two; one damping member 60 or three or more damping members 60 may be provided. A location where the damping member 60 is provided is not limited to a location near the boundary between the actuator block 29a and the actuator block 29b and on both sides of the boundary in an axial direction; the damping member 60 may be provided in other locations. The damping member 60 is not limited to a sheet-like damping member; the damping member 60 may be provided as an adhesive layer or a viscoelastic layer that is formed by applying an adhesive material or a viscoelastic material to the outer circumferential surface of the base shaft 26 or the inner circumferential surface of the bearing shaft 54.

The present disclosure is not limited to the above-described embodiments in their original form and may be embodied with an element modified in the implementation stage without departing from the spirit of the present disclosure. Moreover, various embodiments may be achieved by appropriately combining the elements disclosed in the embodiment described above. For example, some elements of all the elements described in the embodiment may be eliminated. Furthermore, elements in different embodiments may be combined as appropriate.

The multi-actuator assembly is not limited to a multi-actuator assembly including two actuator assemblies: first and second actuator assemblies. The multi-actuator assembly may have a structure in which three or more actuator assemblies are pivotally supported on a common base shaft. The number of magnetic disks is not limited to nine; the number of magnetic disks may be eight or less or ten or more. The number of head suspension assemblies and the number of magnetic heads may also be increased or decreased in accordance with the number of magnetic disks. The materials for elements constituting the disk device and the shapes, sizes and so forth of these elements are not limited to those of the above-described embodiments and may be changed in various ways when necessary.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A disk device comprising:
   one or more disks;
   a base shaft;
   a bearing shaft having a tubular portion mounted on an outer periphery of the base shaft;
   first and second bearing units that are attached around the bearing shaft and aligned in an axial direction of the bearing shaft;
   first and second actuator assemblies coupled to the first and second bearing units, respectively; and
   a damping member provided between an outer circumferential surface of the base shaft and an inner circumferential surface of the tubular portion of the bearing shaft, wherein
   the inner circumferential surface of the tubular portion of the bearing shaft has a recessed region in which the damping member is disposed, and
   the damping member is adhered to the recessed region of the bearing shaft.

2. The disk device according to claim 1, wherein
   the first and second bearing units are aligned in the axial direction with a gap therebetween, and
   a portion of the damping member faces the gap via the bearing shaft in a radial direction of the bearing shaft.

3. The disk device according to claim 1, wherein the damping member is spaced apart from the outer circumferential surface of the base shaft.

4. The disk device according to claim 1, wherein a depth of the recessed region is greater than a thickness of the damping member.

5. The disk device according to claim 1, further comprising:
   a second damping member provided between the outer circumferential surface of the base shaft and the inner circumferential surface of the tubular portion of the bearing shaft,
   wherein the damping member and the second damping member are aligned in a circumferential direction of the bearing shaft with a gap therebetween.

6. The disk device according to claim 1, further comprising:
   a second damping member provided between the outer circumferential surface of the base shaft and the inner circumferential surface of the tubular portion of the bearing shaft,
   wherein the damping member and the second damping member are aligned in the axial direction with a gap therebetween.

7. The disk device according to claim 6, wherein
   the damping member faces the first bearing unit via the bearing shaft in a radial direction of the bearing shaft, and
   the second damping member faces the second bearing unit via the bearing shaft in the radial direction.

8. The disk device according to claim 1, wherein the damping member is a sheet comprising an adhesive layer and a restraint layer on the adhesive layer.

9. The disk device according to claim 8, wherein the restraint layer is formed of a metal.

10. The disk device according to claim 8, wherein the restraint layer is formed of a resin.

11. The disk device according to claim 1, wherein an upper edge and a lower edge of the damping member extend in a circumferential direction of the bearing shaft and side edges of the damping member extend in the axial direction.

12. The disk device according to claim 1, wherein the first actuator assembly comprises:
 a first actuator block fixed to the first bearing unit;
 a first plurality of suspension assemblies extending from the first actuator block in a radial direction of the bearing shaft; and
 a first plurality of magnetic heads provided on the first plurality of suspension assemblies, and
the second actuator assembly comprises:
 a second actuator block fixed to the second bearing unit;
 a second plurality of suspension assemblies extending from the second actuator block in the radial direction of the bearing shaft; and
 a second plurality of magnetic heads provided on the second plurality of suspension assemblies.

13. The disk device according to claim 1, wherein the first bearing unit comprises a first sleeve provided around the bearing shaft and a first bearing provided between the bearing shaft and the first sleeve, and
the second bearing unit comprises a second sleeve provided around the bearing shaft and a second bearing provided between the bearing shaft and the second sleeve.

14. A disk device comprising:
one or more disks;
a base shaft;
a bearing shaft having a tubular portion mounted on an outer periphery of the base shaft;
first and second bearing units that are attached around the bearing shaft and aligned in an axial direction of the bearing shaft;
first and second actuator assemblies coupled to the first and second bearing units, respectively; and
a damping member provided between an outer circumferential surface of the base shaft and an inner circumferential surface of the tubular portion of the bearing shaft, wherein
the inner circumferential surface of the tubular portion of the bearing shaft has a recessed region in which the damping member is disposed, and
a depth of the recessed region is greater than a thickness of the damping member.

15. The disk device according to claim 14, wherein
the first and second bearing units are aligned in the axial direction with a gap therebetween, and
a portion of the damping member faces the gap via the bearing shaft in a radial direction of the bearing shaft.

16. The disk device according to claim 14, wherein the damping member is spaced apart from the outer circumferential surface of the base shaft.

17. The disk device according to claim 14, further comprising:
a second damping member provided between the outer circumferential surface of the base shaft and the inner circumferential surface of the tubular portion of the bearing shaft,
wherein the damping member and the second damping member are aligned in a circumferential direction of the bearing shaft with a gap therebetween.

18. The disk device according to claim 14, wherein the damping member is a sheet comprising an adhesive layer and a restraint layer on the adhesive layer.

19. The disk device according to claim 14, wherein the first actuator assembly comprises:
 a first actuator block fixed to the first bearing unit;
 a first plurality of suspension assemblies extending from the first actuator block in a radial direction of the bearing shaft; and
 a first plurality of magnetic heads provided on the first plurality of suspension assemblies, and
the second actuator assembly comprises:
 a second actuator block fixed to the second bearing unit;
 a second plurality of suspension assemblies extending from the second actuator block in the radial direction of the bearing shaft; and
 a second plurality of magnetic heads provided on the second plurality of suspension assemblies.

20. The disk device according to claim 14, wherein
the first bearing unit comprises a first sleeve provided around the bearing shaft and a first bearing provided between the bearing shaft and the first sleeve, and
the second bearing unit comprises a second sleeve provided around the bearing shaft and a second bearing provided between the bearing shaft and the second sleeve.

* * * * *